United States Patent
Wang et al.

(10) Patent No.: US 11,982,339 B2
(45) Date of Patent: May 14, 2024

(54) ELECTRO-HYDRAULIC LINEAR LEAD SCREW ACTUATOR

(71) Applicants: Shu Wang, Yorkville, WI (US); Matthew Schoenberg, Kenosha, WI (US)

(72) Inventors: Shu Wang, Yorkville, WI (US); Matthew Schoenberg, Kenosha, WI (US)

(73) Assignees: ZOOMLION HEAVY INDUSTRY NA, INC., Yorkville, WI (US); ZOOMLION HEAVY INDUSTRY SCIENCE AND TECHNOLOGY CO. LTD. (CN)

( * ) Notice: Subject to any disclaimer, the term of this patent is extended or adjusted under 35 U.S.C. 154(b) by 0 days.

(21) Appl. No.: 18/101,604

(22) Filed: Jan. 26, 2023

(65) Prior Publication Data
US 2024/0019017 A1    Jan. 18, 2024

Related U.S. Application Data

(63) Continuation-in-part of application No. 17/863,945, filed on Jul. 13, 2022, now Pat. No. 11,773,949.

(51) Int. Cl.
*F16H 25/20*    (2006.01)
*F15B 15/14*    (2006.01)
*F16H 25/22*    (2006.01)

(52) U.S. Cl.
CPC ......... *F16H 25/2204* (2013.01); *F15B 15/14* (2013.01); *F15B 2015/1495* (2013.01); *F16H 2025/2062* (2013.01)

(58) Field of Classification Search
CPC .............. F15B 2015/1495; F15B 15/02; F15B 15/088; F16H 2025/2081; F16H 2025/2436; F16H 2025/204; F16H 25/2006
See application file for complete search history.

(56) References Cited

U.S. PATENT DOCUMENTS 7,397,209 B2 *   7/2008   Hirai ................... F15B 15/088
                                                     310/112
7,939,979 B2 *   5/2011   Hochhalter ............ H02K 11/21
                                                     310/80

(Continued)

FOREIGN PATENT DOCUMENTS

CN           112211859 A   *  1/2021
WO      WO 1997/037422         9/1997
WO      WO 2014/058370         4/2014

*Primary Examiner* — Gregory Robert Weber
(74) *Attorney, Agent, or Firm* — Donald J. Ersler (57) ABSTRACT

An electro-hydraulic linear lead screw actuator preferably includes an electric motor device, a hydraulic tube, an actuator lead screw, an actuator screw nut, an actuator rod and at least one external hydraulic flow passage. The actuator lead screw is rotated by the electric motor device. The actuator screw nut preferably includes a piston portion, a first screw nut portion and a second screw nut portion. A lead screw thread is formed through the first and second screw nut portions to threadably receive the actuator lead screw. The actuator rod is retained on the piston portion. Rotation of the electric motor device causes the actuator rod to extend or retract. A first hydraulic chamber is located behind the piston portion and a second hydraulic chamber is located in front of the piston portion. At least one external hydraulic flow passage transfers hydraulic fluid between the first and second chambers.

20 Claims, 7 Drawing Sheets

(56) References Cited

U.S. PATENT DOCUMENTS

| | | | | |
|---|---|---|---|---|
| 10,925,754 B2* | 2/2021 | Goldfarb | ............... | A61F 2/6607 |
| 11,773,949 B1* | 10/2023 | Wang | ................. | F16H 25/2204 |
| | | | | 74/89.42 |
| 2021/0364070 A1* | 11/2021 | Keranen | ............ | F16H 25/2252 |

* cited by examiner

ELECTRO-HYDRAULIC LINEAR LEAD SCREW ACTUATOR

CROSS-REFERENCES TO RELATED APPLICATIONS

This is a continuation-in-part patent application which takes priority from patent application Ser. No. 17/863,945, filed on Jul. 13, 2022.

BACKGROUND OF THE INVENTION

Field of the Invention

The present invention relates generally to heavy duty equipment and more specifically to an electro-hydraulic linear lead screw actuator, which is able to provide high precision movement with less maintenance requirements than a hydraulic cylinder.

Discussion of the Prior Art

In heavy duty machinery, linear hydraulic cylinders are used extensively, because they have important attributes including high power density, large load handling capability and shock resistance. Hydraulic cylinders are used in a range of heavy load-handling applications in outdoor construction, marine, material handling, aerospace, agriculture equipment, and in other applications. Electric linear actuators are popular in industrial manufacturing and conveying systems. The electric linear actuator includes a motor that powers a lead screw. The lead screw includes a ball nut, which is moved in a linear motion along the lead screw. Electric linear actuators can achieve high precision and speed with little or zero maintenance. However, electric linear cylinders are typically not suitable for harsh operating environments, strong workloads, and large shocks. PCT patent no. WO 1997/037422 to Kimura et al. discloses a motor-driven cylinder. PCT patent no. WO 2014/058370 to Carlsson discloses an actuator.

Accordingly, there is clearly felt need in the art for an electro-hydraulic linear screw actuator, which is able to provide high precision movement with less maintenance requirements than a hydraulic cylinder; can operate in hostile working environments; and is able to handle heavy loads.

SUMMARY OF THE INVENTION

The present invention provides an electro-hydraulic linear lead screw actuator which provides high precision movement and can operate in hostile working environments. An electro-hydraulic linear ball screw actuator preferably includes an electric motor device, a hydraulic tube, an actuator ball screw, a ball nut device, an actuator rod and at least one external hydraulic flow passage. The hydraulic tube is terminated with a first end cap on a first end and a second end cap on an opposing second end. A first tube diameter extends from the first end cap for insertion into a first end of the hydraulic tube. A second tube diameter extends from the second end cap for insertion into a second end of the hydraulic tube. A plurality of studs are inserted through the first and second end caps. A plurality of nuts are threaded on to the plurality of studs to retain the hydraulic tube between the first and second end caps. One end of the actuator ball screw is rotatably retained in the first end cap. A ball thread is formed on an outer perimeter of the actuator ball screw. The actuator rod is slidably retained in the second end cap.

The ball nut device includes a ball nut base, a piston portion and a rod thread. The ball nut base portion extends from one end of the piston portion and the rod thread extends from an opposing end of the piston portion. At least one O-ring groove is formed in an outer perimeter of the piston portion to receive at least one O-ring. The ball nut base includes a plurality of ball bearings, a ball bearing loop and an actuator ball screw opening. Ball nuts are well known in the art and need not be explained in detail. The actuator ball screw opening is sized to receive the actuator ball screw. The plurality of ball bearings are retained in the ball bearing loop. A portion of the ball bearing loop allows some of the plurality of ball bearings to extend into the actuator ball screw opening and engage the actuator ball screw.

The outer perimeter of the piston portion is sized to be received by an inner perimeter of the hydraulic tube. The actuator rod includes an inner rod perimeter and a threaded entrance on one end. A pin retainer is formed on an opposing end of the actuator rod. The threaded entrance is sized to threadably receive the rod thread. The actuator rod is retained on the piston portion by threading the actuator rod on to the rod thread. A rod bushing is located in the second end cap. The rod bushing in the second end cap slidably supports a length of the actuator rod. At least one gasket plate is attached to the second end cap. A non-rotation flat is formed on a top of the actuator rod. The gasket plate includes a D-shaped opening, which is sized to receive an outer perimeter of the actuator rod. The D-shaped opening prevents the actuator rod and the piston portion from rotating. The actuator ball screw is preferably terminated with a rod bearing. The rod bearing is sized to be received by the inner rod perimeter. The inner rod perimeter slidably and rotatably supports the second end of the actuator ball screw.

A first hydraulic chamber is formed behind the piston portion and a second hydraulic chamber is formed in front of the piston portion. An accumulator communicates with the hydraulic tube, at a rear of the first hydraulic chamber. A first end of each external hydraulic flow passage communicates with a first end (first hydraulic chamber) of the hydraulic tube and a second end of the at least one external hydraulic flow passage communicates with a second end (second hydraulic chamber) of the hydraulic tube. The electric motor device preferably includes an electric motor and a gearbox. The electric motor rotates the actuator ball screw through the gearbox in either clockwise or counter-clockwise directions. The actuator ball screw is engaged with an output of the gearbox.

The electro-hydraulic linear ball screw actuator preferably works in the following way. The actuator rod is extended or retracted by supplying electric current to the electric motor. The electric motor rotates the actuator ball screw through the gearbox. Rotation in one direction by the actuator ball screw causes the ball nut device to move forward and extend the actuator rod. Hydraulic fluid in the second chamber will be forced through the at least one external flow passage into the first chamber. The hydraulic fluid in the first chamber will support the actuator rod through the piston portion. Support for a load on the end of the actuator rod is mainly supported by hydraulic fluid, not the actuator ball screw and ball nut device. The actuator ball screw and ball nut device are used for precision location of the actuator rod. Hydraulic fluid trapped between the plurality of balls in the ball nut device will act as a pump to pressurize the hydraulic fluid.

An electro-hydraulic linear lead screw actuator preferably includes an electric motor device, a hydraulic tube, an actuator lead screw, an actuator screw nut, an actuator rod and at least one external hydraulic flow passage. The hydraulic tube is terminated with a first end cap on a first end and a second end cap on an opposing second end. A first tube diameter extends from the first end cap for insertion into a first end of the hydraulic tube. A second tube diameter extends from the second end cap for insertion into a second end of the hydraulic tube. A plurality of studs are inserted through the first and second end caps. A plurality of nuts are threaded on to the plurality of studs to retain the hydraulic tube between the first and second end caps. One end of the actuator lead screw is rotatably retained in the first end cap.

The actuator screw nut includes a piston portion, a first screw nut portion and a second screw nut portion. The first screw nut portion extends from a first end of the piston portion and the second screw nut portion extends from a second end of the piston portion. A lead screw thread is formed through the first and second screw nut portions to threadably receive the actuator lead screw. A tube thread is formed on an outer diameter of the second screw nut portion. At least one O-ring groove is formed in an outer perimeter of the piston portion to receive at least one O-ring. The outer perimeter of the piston portion is sized to be received by an inner perimeter of the hydraulic tube. The actuator rod includes an inner rod perimeter and a threaded entrance on one end. The threaded entrance is sized to threadably receive the tube thread on the second screw nut portion. A pin retainer is formed on an opposing end of the actuator rod. The actuator rod is slidably retained in the second end cap.

A rod bushing is located in the second end cap. The rod bushing in the second end cap slidably supports a length of the actuator rod. At least one bearing plate is attached to the second end cap. A non-rotation flat is preferably formed on a top of the actuator rod. The bearing plate includes a D-shaped opening, which is sized to receive an outer perimeter of the actuator rod. The D-shaped opening prevents the actuator rod and the piston portion from rotating. The actuator lead screw is preferably terminated with a rod bearing. The rod bearing is sized to be received by the inner rod perimeter of the actuator rod. The inner rod perimeter slidably and rotatably supports the second end of the actuator rod.

A first hydraulic chamber is formed behind the piston portion and a second hydraulic chamber is formed in front of the piston portion. An accumulator communicates with the hydraulic tube, at a rear of the first hydraulic chamber. A first end of each external hydraulic flow passage communicates with a first end (first hydraulic chamber) of the hydraulic tube and a second end of the at least one external hydraulic flow passage communicates with a second end (second hydraulic chamber) of the hydraulic tube. The electric motor device preferably includes an electric motor and a gearbox. The electric motor rotates the actuator rod through the gearbox in either clockwise or counterclockwise directions. The actuator rod is engaged with an output of the gearbox.

The electro-hydraulic linear lead screw actuator preferably works in the following way. The actuator rod is extended or retracted by supplying electric current to the electric motor. The electric motor rotates the actuator lead screw through the gearbox. Rotation in one direction by the actuator lead screw causes the actuator screw nut to move forward and extend the actuator rod. Hydraulic fluid in the second chamber will be forced through the at least one external flow passage into the first chamber. The hydraulic fluid in the first chamber will support the actuator rod through the piston portion. Support for a load on the end of the actuator rod is mainly supported by hydraulic fluid, not the actuator screw nut. The actuator screw nut is used for precision location of the actuator rod.

Accordingly, it is an object of the present invention to provide an electro-hydraulic linear ball screw actuator which is able to provide high precision movement with less maintenance requirements than a hydraulic cylinder and can operate in hostile working environments.

It is another object of the present invention to provide an electro-hydraulic linear ball screw actuator which is able to support a large load.

It is further object of the present invention to provide an electro-hydraulic linear lead screw actuator which is able to provide high precision movement with less maintenance requirements than a hydraulic cylinder and can operate in hostile working environments.

Finally, it is another object of the present invention to provide an electro-hydraulic linear lead screw actuator which is able to support a large load.

These and additional objects, advantages, features and benefits of the present invention will become apparent from the following specification.

DETAILED DESCRIPTION OF THE PREFERRED EMBODIMENTS

Figures 1, 2:
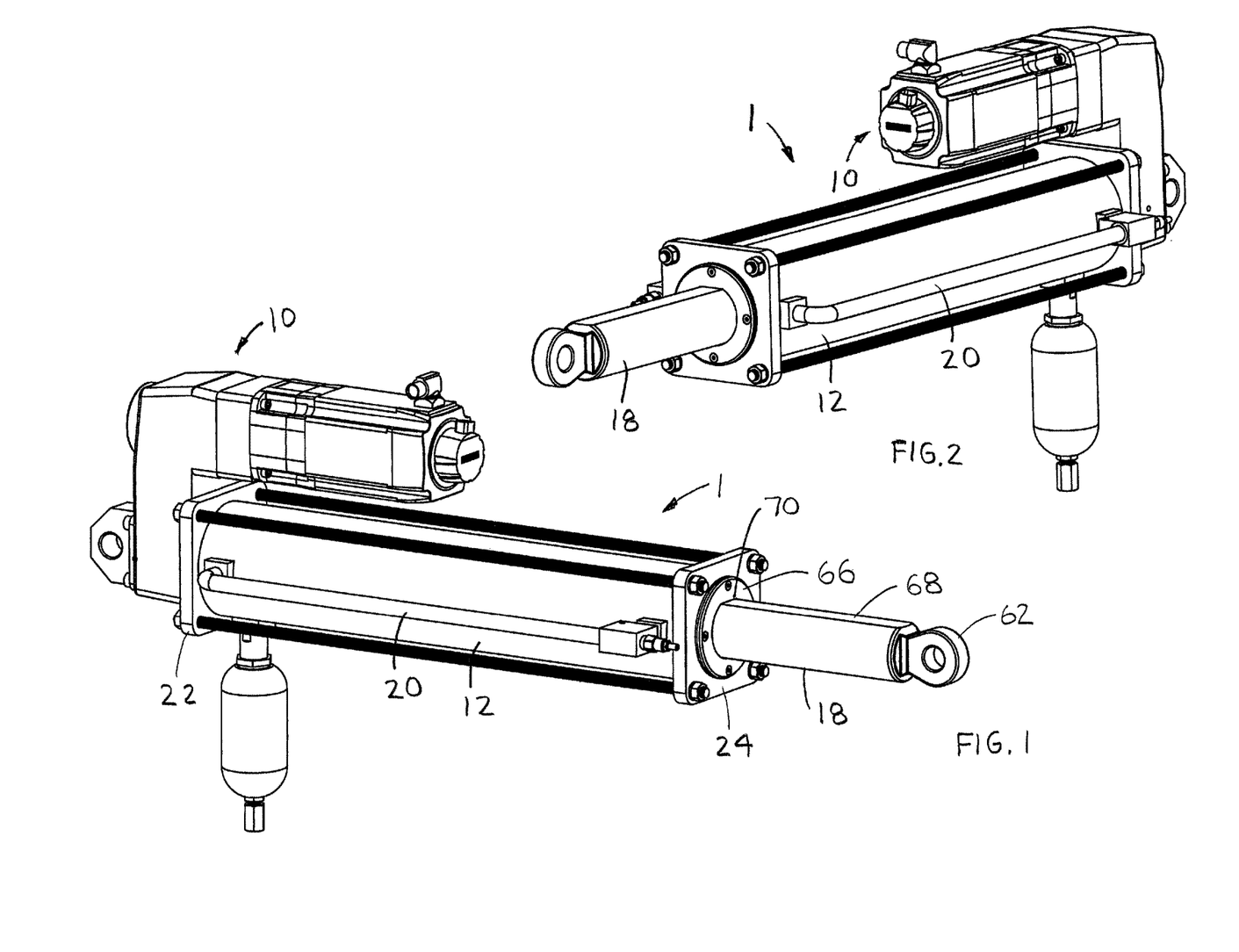
FIG. 1 is a left-side perspective view of an electro-hydraulic linear ball screw actuator in accordance with the present invention.
FIG. 2 is a right-side perspective view of an electro-hydraulic linear ball screw actuator in accordance with the present invention.
Figure 3:
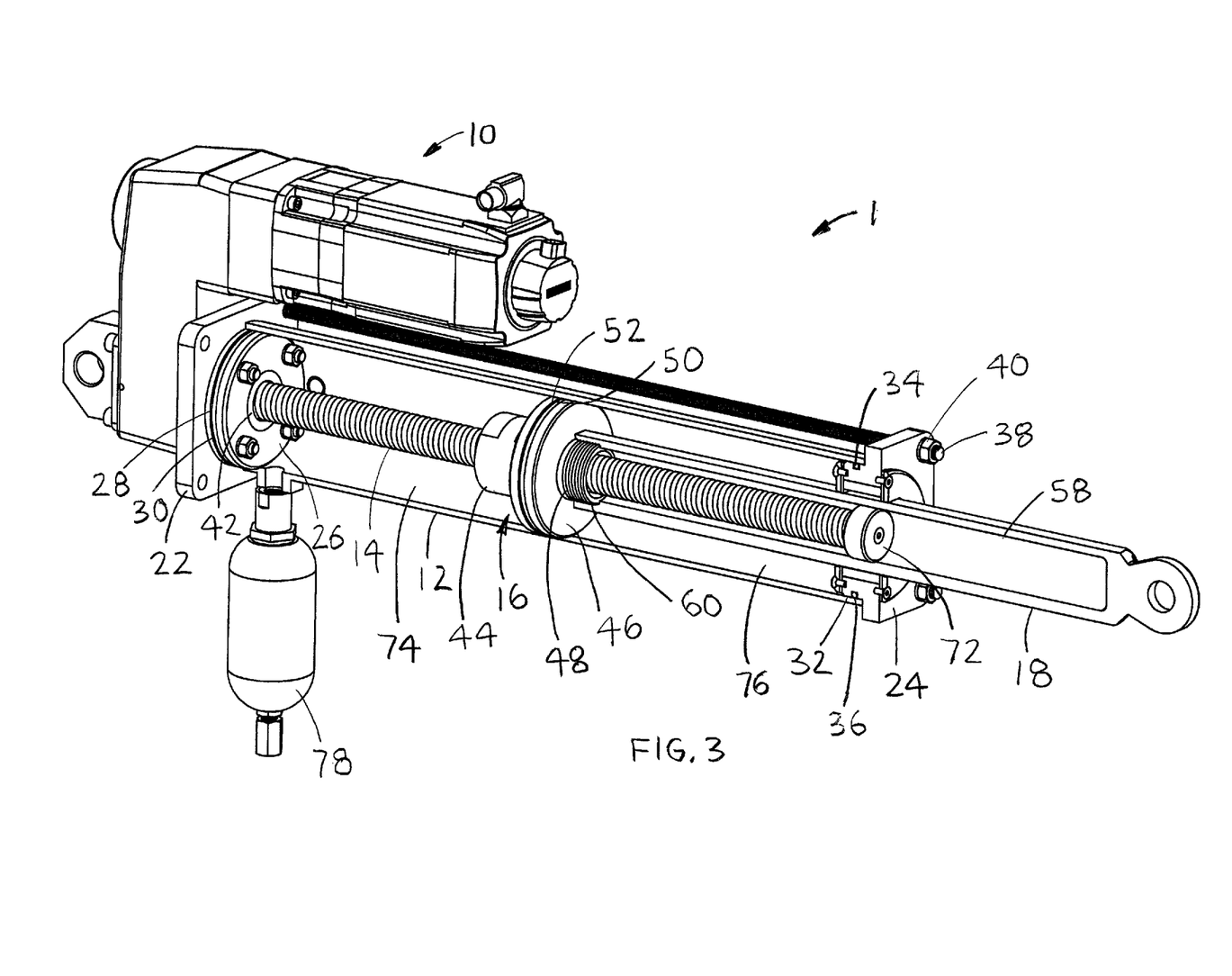
FIG. 3 is a left-side perspective view of an electro-hydraulic linear ball screw actuator with a cutaway of a hydraulic tube and an actuation rod in accordance with the present invention.
Figure 4:
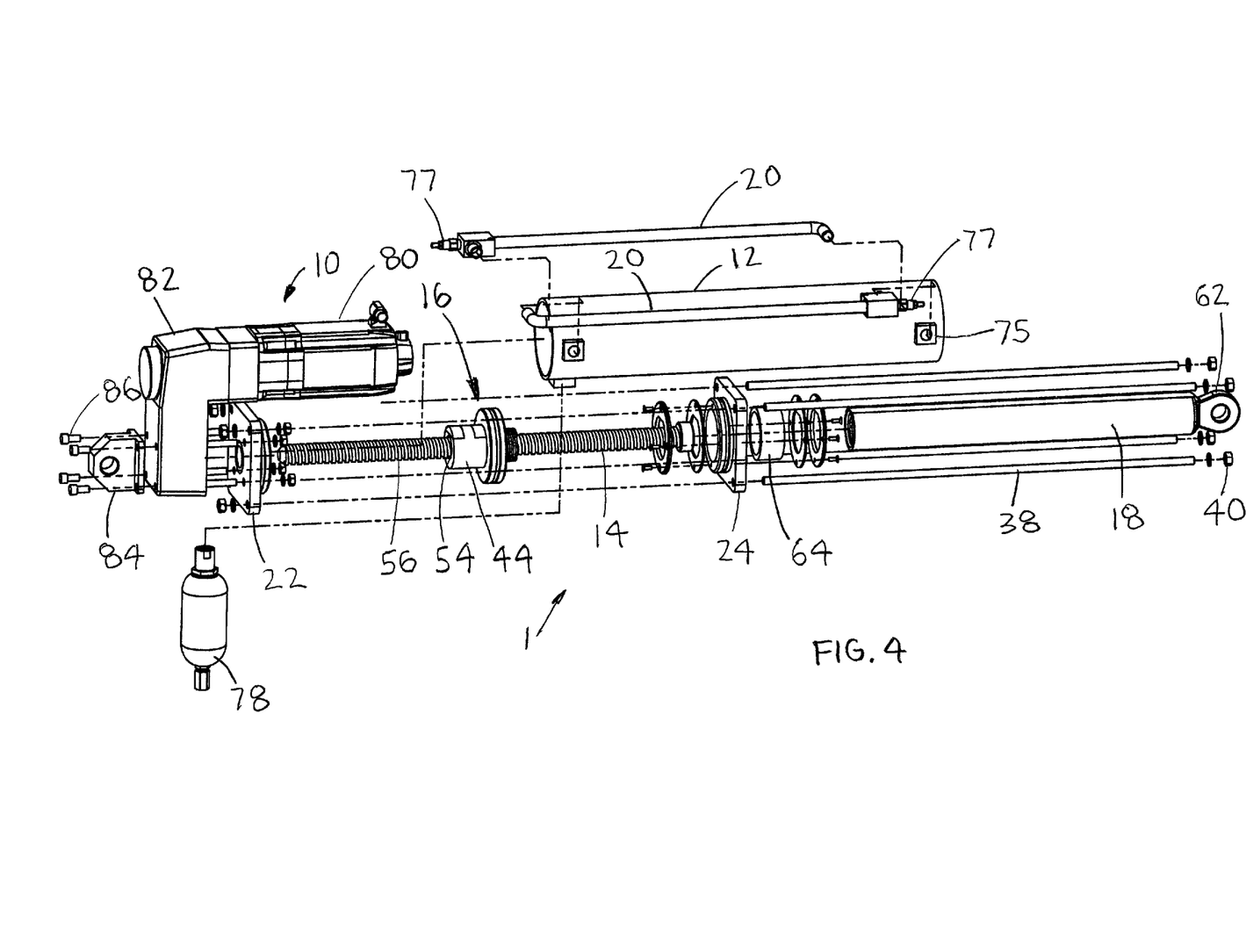
FIG. 4 is an exploded perspective view of an electro-hydraulic linear ball screw actuator in accordance with the present invention.
Figure 5:
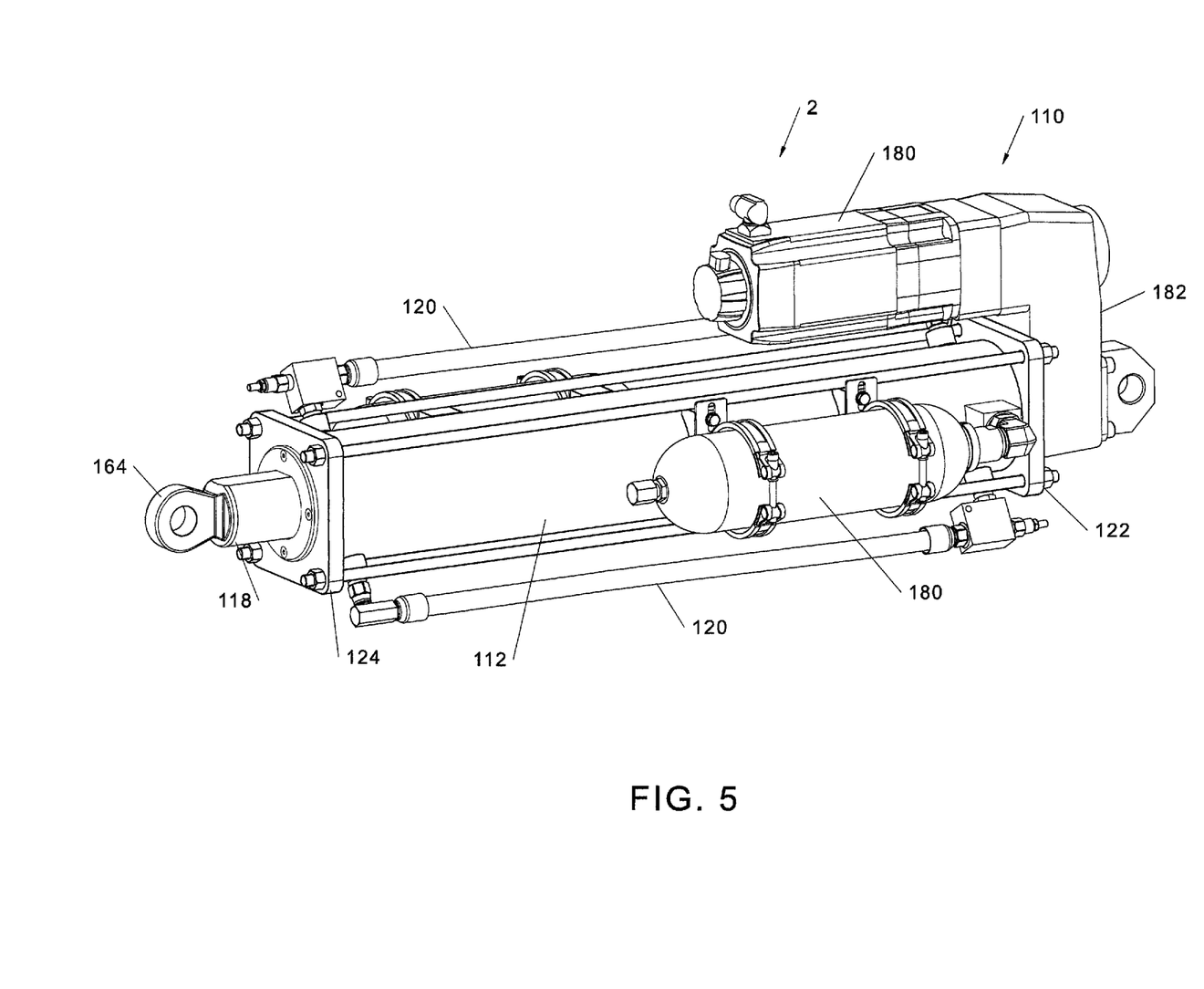
FIG. 5 is a left-side perspective view of an electro-hydraulic linear lead screw actuator in accordance with the present invention.
Figure 6:
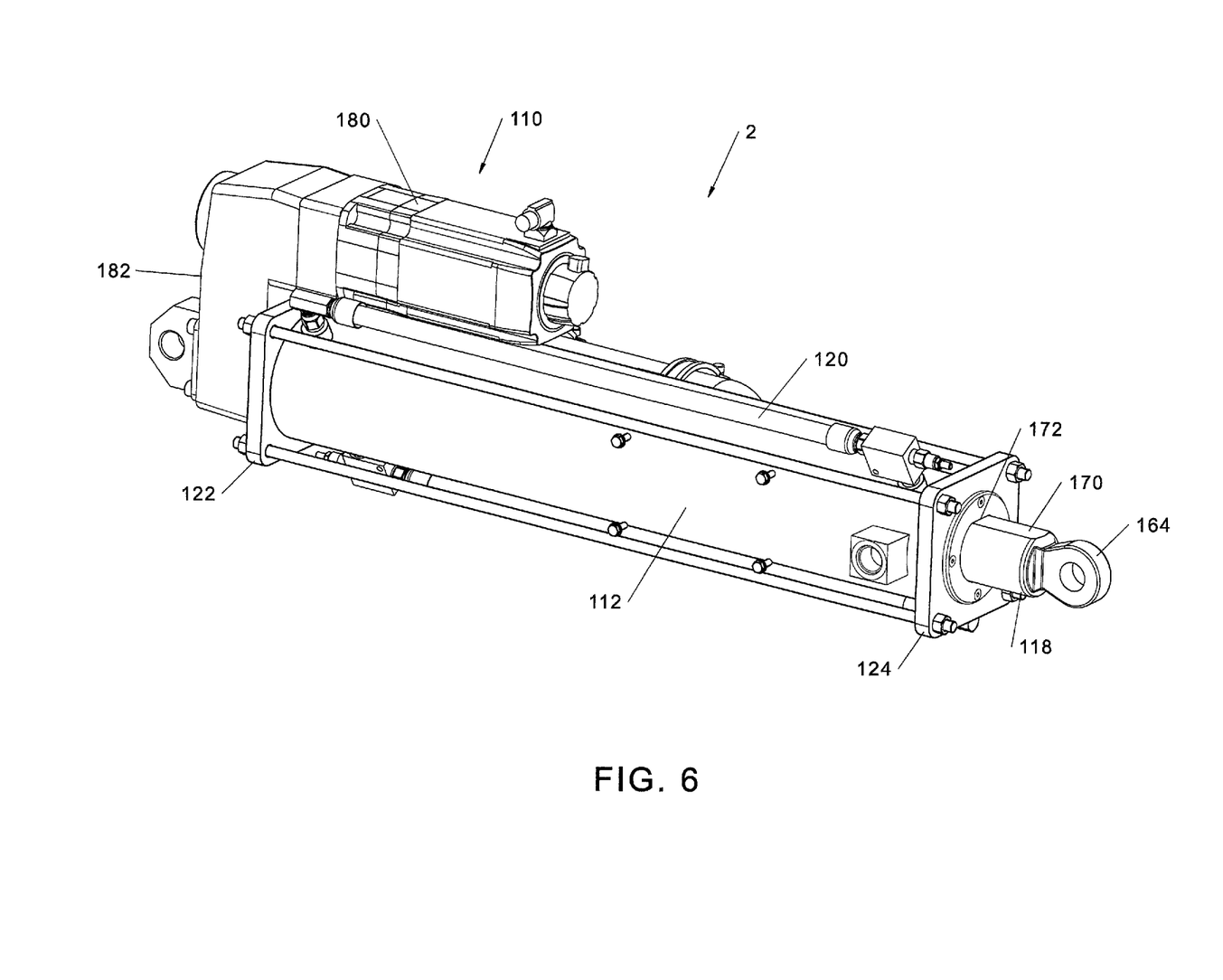
FIG. 6 is a right-side perspective view of an electro-hydraulic linear lead screw actuator in accordance with the present invention.
Figure 7:
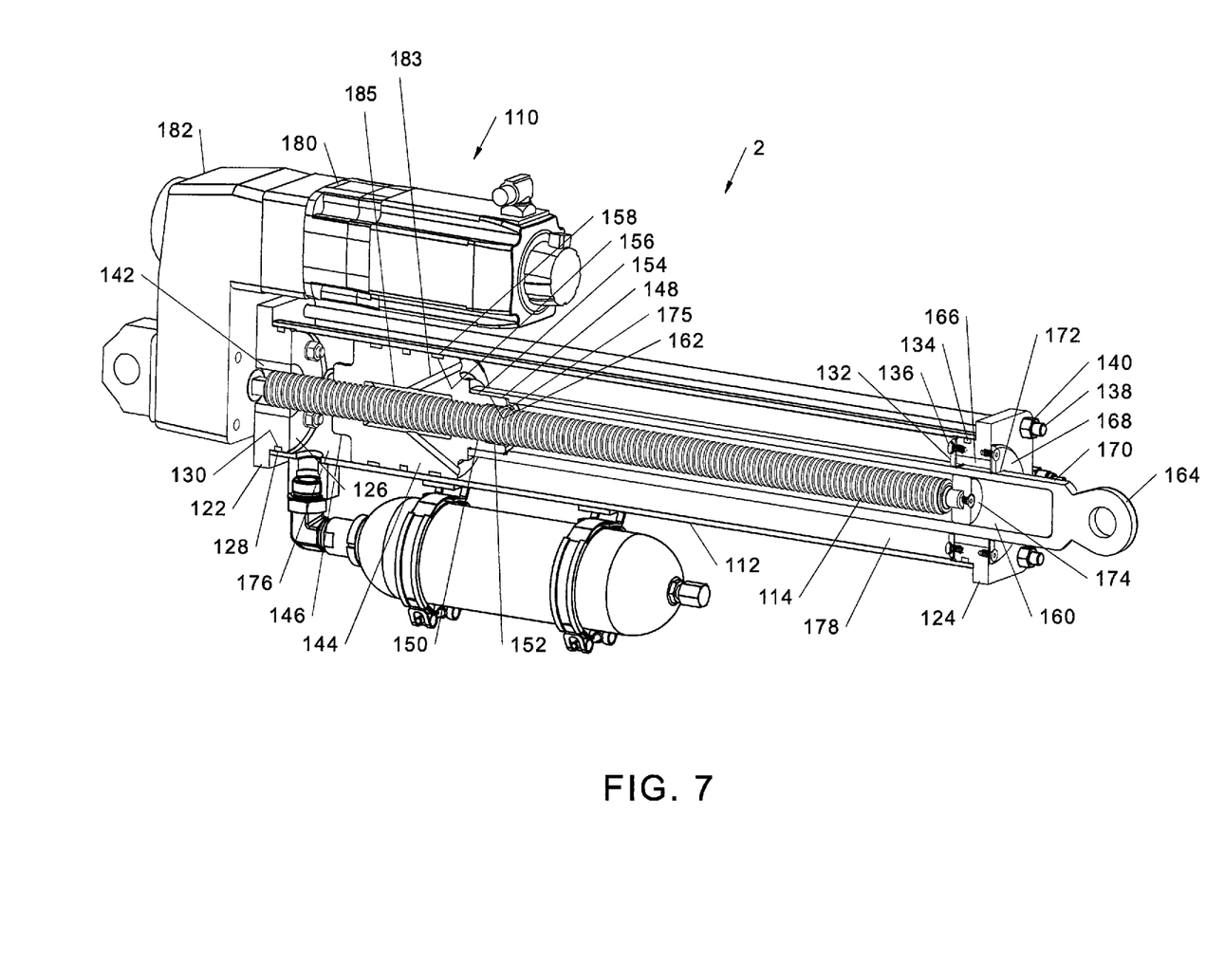
FIG. 7 is a left-side perspective view of an electro-hydraulic linear lead screw actuator with a cutaway of a hydraulic tube and an actuation rod in accordance with the present invention.
Figure 8:
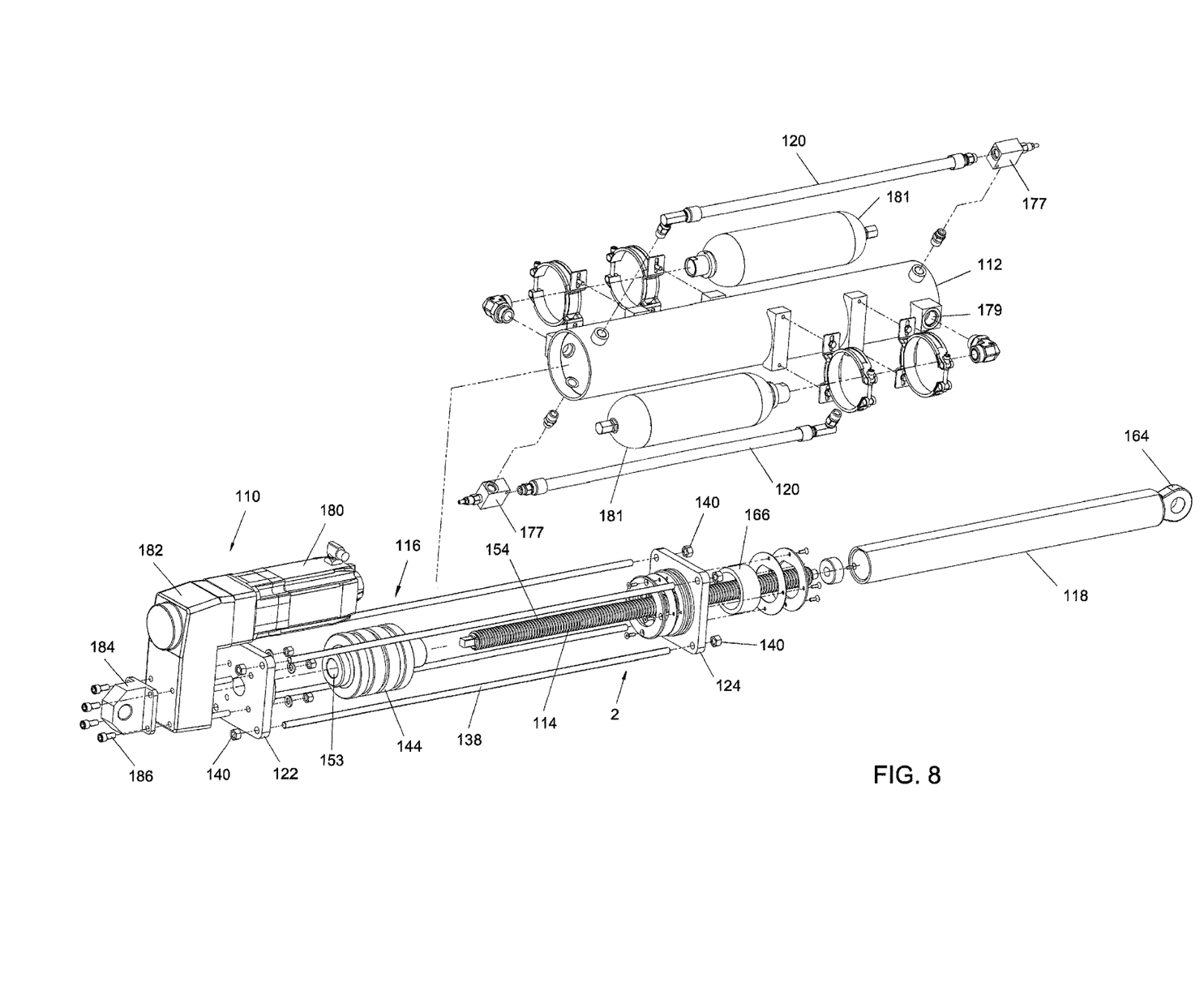
FIG. 8 is an exploded perspective view of an electro-hydraulic linear lead screw actuator in accordance with the present invention.

With reference now to the drawings, and particularly to FIG. 1, there is shown a left-side perspective view of an electro-hydraulic linear ball screw actuator 1. With reference to FIGS. 2-4, the electro-hydraulic linear ball screw actuator 1 preferably includes an electric motor device 10, a hydraulic tube 12, an actuator ball screw 14, a ball nut device 16, an actuator rod 18 and at least one external hydraulic flow passage 20. The hydraulic tube 12 is terminated with a first end cap 22 on one end and a second end cap 24 on an opposing end. A first tube diameter 26 extends from the first end cap 22 for insertion into a first end of the hydraulic tube 12. A first O-ring 28 is retained in a first O-ring groove 30 in the first tube diameter 26. A second tube diameter 32 extends from the second end cap 24 for insertion into a second end of the hydraulic tube 12. A second O-ring 34 is retained in a first O-ring groove 36 in the second tube diameter 32. A plurality of studs 38 are inserted through holes in the first and second end caps 22, 24. A plurality of nuts 40 are threaded on to the plurality of studs 38 to retain the hydraulic tube 12 between the first and second end caps 22, 24. One end of the actuator ball screw 14 is rotatably retained in the first end cap 22. A ball thread is formed on an outer perimeter of the actuator ball screw 14, the ball thread is sized to receive a plurality of ball bearings (not shown) in the ball nut device 16. A screw seal 42 is retained in a counterbore in the first tube diameter 26. The screw seal 42 provides a seal between the actuator ball screw 14 and the first tube diameter 26 to prevent leakage of hydraulic fluid. The actuator rod 18 is slidably retained in the second end cap 24.

The ball nut device 16 includes a ball nut base 44, a piston portion 46 and a rod thread 48. The ball nut base 44 extends from one end of the piston portion 46 and the rod thread 48 extends from an opposing end of the piston portion 46. At least one piston O-ring groove 50 is formed in an outer perimeter of the piston portion 46 to receive at least one piston O-ring 52. The ball nut base 44 includes a plurality of ball bearings, a ball bearing loop and an actuator ball screw opening 54. Ball nuts are well known in the art and need not be explained in detail. However, inventors incorporate by reference in their entirety, the following illustrations shown on the Machine Design website, at web address: machinedesign.com/mechanical-motion-systems/article/21163885/getting-up-to-speed The actuator ball screw opening 54 is sized to receive the actuator ball screw 14. The plurality of ball bearings are retained in the ball bearing loop. A portion of the ball bearing loop allows some of the plurality of ball bearings to extend into the actuator ball screw opening 54 and engage ball threads 56 of the actuator ball screw 14.

The outer perimeter of the piston portion 46 is sized to be received by an inner perimeter of the hydraulic tube 12. The actuator rod 18 includes an inner rod perimeter 58 and a threaded entrance 60 on one end. A pin retainer 62 is formed on an opposing end of the actuator rod 18. The threaded entrance 60 is sized to threadably receive the rod thread 48. The actuator rod 18 is retained on the piston portion 46 by threading the actuator rod 18 on to the rod thread 48. A rod bushing 64 is located in the second end cap 24. The rod bushing 64 slidably and rotatably supports a length of the actuator rod 18. At least one bearing plate 66 is attached to the second end cap 24. A non-rotation flat 68 is formed on a top of the actuator rod 18. The bearing plate 66 includes a D-shaped opening 70, which is sized to receive an outer perimeter of the actuator rod 18. The D-shaped opening 70 prevents the actuator rod 18 and the piston portion 46 from rotating. The actuator ball screw 14 is preferably terminated with a rod bearing 72. The rod bearing 72 is sized to be received by the inner rod perimeter 58 to radially and slidably support an end of the actuator ball screw 14.

A first hydraulic chamber 74 is formed behind the piston portion 46 and a second hydraulic chamber 76 is formed in front of the piston portion 46. An accumulator 78 communicates with the hydraulic tube 12, at a rear of the first hydraulic chamber 74. A first end of each external hydraulic flow passage 20 communicates with a first end (first hydraulic chamber 74) of the hydraulic tube 12 through ports 75 and a second end of the at least one external hydraulic flow passage 20 communicates with a second end (second hydraulic chamber 76) of the hydraulic tube 12 through ports 75. It is preferable that each external hydraulic flow passage 20 have a relief valve manifold containing a fill/bleed plug 77. The electric motor device 10 preferably includes an electric motor 80 and a gearbox 82. The electric motor 80 rotates the actuator ball screw 14 through the gearbox 82 in either clockwise or counterclockwise directions. The actuator ball screw 14 is engaged with the gearbox 82. A mount end 84 is preferably attached to the gearbox 82 with fasteners 86.

The electro-hydraulic linear ball screw actuator 1 preferably works in the following manner. The actuator rod 18 is extended or retracted by supplying electric current to the electric motor device 10. The electric motor 80 rotates the actuator ball screw 14 through the gearbox 82. Rotation in one direction by the actuator ball screw 14 causes the ball nut device 44 to move forward and extend the actuator rod 18. Hydraulic fluid in the second chamber 76 will be forced through the at least one external flow passage 20 into the first chamber 74. The hydraulic fluid in the first chamber 74 will support the actuator rod 18 through the piston portion 44. Support for a load on the end of the actuator rod 18 is mainly accomplished through hydraulic fluid, not the actuator ball screw 14 and the ball nut device 46. The actuator ball screw 14 and ball nut device 44 are used for precision location of the actuator rod 18. Hydraulic fluid trapped between the plurality of balls in the ball nut device 44 will act as a pump to pressurize the hydraulic fluid.

With reference to FIGS. 5-8, an electro-hydraulic linear lead screw actuator 2 preferably includes an electric motor device 110, a hydraulic tube 112, an actuator lead screw 114, actuator screw nut 116, an actuator rod 118 and at least one external hydraulic flow passage 120. The hydraulic tube 112 is terminated with a first end cap 122 on a first end and a second end cap 124 on an opposing second end. A first tube diameter 126 extends from the first end cap 122 for insertion into a first end of the hydraulic tube 112. A first O-ring 128 is retained in a first O-ring groove 130 in the first tube diameter 126. A second tube diameter 132 extends from the second end cap 124 for insertion into a second end of the hydraulic tube 112. A second O-ring 134 is retained in a second O-ring groove 136 in the second tube diameter 132. A plurality of studs 138 are inserted through the first and second end caps 122, 124. A plurality of nuts 140 are threaded on to the plurality of studs 138 to retain the hydraulic tube 112 between the first and second end caps 122, 124. One end of the actuator lead screw 114 is rotatably retained in the first end cap 122. A screw seal 142 is retained in a counterbore in the first tube diameter 126. The screw seal 142 provides a seal between the actuator lead screw 114 and the first tube diameter 126 to prevent leakage of hydraulic fluid.

The actuator screw nut 116 includes a piston portion 144, a first screw nut portion 146 and a second screw nut portion 148. The first screw nut 146 portion extends from a first end of the piston portion 126 and the second screw nut portion 148 extends from a second end of the piston portion 144. A lead screw thread 150 is formed through the first and second screw nut portions 146, 148 to threadably receive the actuator lead screw 114. An actuator ball screw opening 153 is also formed through the piston portion 144. A lead-in bore 152 is preferably formed at an entrance of the lead screw thread 150 in the second nut portion 148. The lead screw thread 150 is preferably an Acme thread, but other thread types may also be used. A tube thread 154 is formed on an outer diameter of the second screw nut portion 148. At least one O-ring groove 156 is formed in an outer perimeter of the piston portion to receive at least one O-ring 158. The outer perimeter of the piston portion 144 is sized to be received by an inner perimeter of the hydraulic tube 112. The actuator rod 118 includes an inner rod perimeter 160 and a threaded entrance 162 on one end. The threaded entrance 162 is sized to threadably receive the tube thread 154 on the second screw nut portion 148. A pin retainer 164 is formed on an opposing end of the actuator rod 118. The actuator rod 118 is slidably retained in the second end cap 124. The actuator rod 118 is retained on the second nut portion 148 by threading the threaded entrance 162 of the actuator rod 118 on to the tube thread 154.

A rod bushing 166 is located in the second end cap 124. The rod bushing 166 in the second end cap 124 slidably supports a length of the actuator rod. At least one bearing plate 168 is attached to the second end cap 124. A non-rotation flat 170 is preferably formed on a top of the actuator rod 118. The bearing plate 168 includes a D-shaped opening 172, which is sized to receive an outer perimeter of the actuator rod 118. The D-shaped opening 172 prevents the actuator rod 118 and the piston portion 144 from rotating. The actuator rod 118 is preferably terminated with a rod bearing 174. The rod bearing 174 is sized to be received by the inner rod perimeter 160 of the actuator rod 118. The inner rod perimeter 160 slidably and rotatably supports the second end of the actuator rod 118.

A first hydraulic chamber 176 is formed behind the piston portion 144 and a second hydraulic chamber 178 is formed in front of the piston portion 144. An accumulator 181 communicates with an inside of the hydraulic tube 112, at a rear of the first hydraulic chamber 176. A first end of each external hydraulic flow passage 120 communicates with a first end (first hydraulic chamber 176) of the hydraulic tube 112 and a second end of the at least one external hydraulic flow passage 120 communicates with a second end (second hydraulic chamber 178) of the hydraulic tube 112. It is preferable that each external hydraulic flow passage 120 have a relief valve manifold containing a fill/bleed plug 177. At least opening 175 is preferably formed through a side wall of the actuator rod 118 to allow the flow hydraulic fluid between the inner rod diameter 160 of the actuator rod 118 and an inner perimeter of the hydraulic tube 112. It is preferable that at least one oil passage 183 is formed through a front of the piston 144 to a screw relief cavity 185. Hydraulic oil in the screw relief cavity 185 from the second hydraulic chamber 178 is pumped into the first hydraulic chamber 176 by rotation of the actuator lead screw 114. The hydraulic oil in the screw relief cavity 185 exits through a gap between the lead screw thread 150 and the actuator lead screw 114. The electric motor device 110 preferably includes an electric motor 180 and a gearbox 182. The electric motor 180 rotates the actuator lead screw 114 through the gearbox 182 in either clockwise or counterclockwise directions. The actuator lead screw 114 is engaged with an output of the gearbox 182. A mount end 184 is preferably attached to the gearbox 82 with fasteners 186.

The electro-hydraulic linear lead screw actuator 2 preferably works in the following way. The actuator rod 118 is extended or retracted by supplying electric current to the electric motor 180. The electric motor 180 rotates the actuator lead screw 114 through the gearbox 182. Rotation in one direction by the actuator lead screw 114 causes the actuator screw nut 116 to move forward and extend the actuator rod 118. Hydraulic fluid in the second chamber 178 will be forced through the at least one external flow passage 120 into the first chamber 176. The hydraulic fluid in the first chamber 176 will support the actuator rod 118 through the piston portion 144. Support for a load on the end of the actuator rod 118 is mainly supported by hydraulic fluid, not the actuator screw nut 116. The actuator screw nut 116 is used for precision location of the actuator rod 118.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed:

1. An electro-hydraulic linear lead screw actuator, comprising:
   an electric motor;
   a hydraulic tube;
   an actuator lead screw is rotatably retained in said hydraulic tube, said actuator lead screw is rotated by said electric motor;
   an actuator screw nut includes a piston portion formed on an outside perimeter thereof, a lead screw thread is formed through said actuator screw nut to threadably receive the actuator lead screw, a screw relief cavity is formed in said actuator screw nut, said screw relief cavity includes a perimeter that is greater than an outer perimeter of said actuator lead screw, a first hydraulic chamber is formed in said hydraulic tube between said electric motor and a first end one end of said piston portion, a second hydraulic chamber is formed beyond a second end of said piston portion, at least one oil passage extends from a second end of said piston portion to said screw relief cavity, wherein hydraulic oil is pumped from said second hydraulic chamber through said actuator screw nut to said first hydraulic chamber by rotation of said actuator lead screw; and
   an actuator rod extends from an end of said actuator screw nut, wherein rotation of said actuator lead screw causes said actuator rod to extend or retract.

2. The electro-hydraulic linear lead screw actuator of claim 1, further comprising:
   a first screw nut portion extends from a first end of said actuator screw nut, a second screw nut portion extends from a second end of said actuator screw nut, said lead screw thread is formed in said first and second actuator screw nut portions.

3. The electro-hydraulic linear lead screw actuator of claim 1 wherein:
   said actuator rod includes an inner rod perimeter and a threaded entrance, said inner rod perimeter is sized to receive said actuator lead screw.

4. The electro-hydraulic linear lead screw actuator of claim 3, further comprising:
   a rod bearing is retained on an end of said actuator rod, said rod bearing is sized to be received by said inner rod perimeter.

5. The electro-hydraulic linear lead screw actuator of claim 3 wherein:
   a rod thread is formed on said second actuator screw nut, said threaded entrance is sized threadably receive said rod thread.

6. The electro-hydraulic linear lead screw actuator of claim 1 wherein:
   an outer perimeter of said piston portion is sized to be received by an inner perimeter of said hydraulic tube.

7. The electro-hydraulic linear lead screw actuator of claim 1 wherein:
a rod flat is formed on said actuator rod, a D-shaped opening is formed on one end of said hydraulic tube, said D-shaped opening is sized to receive an outer perimeter of said actuator rod, said actuator rod does not rotate relative to said hydraulic tube.

8. The electro-hydraulic linear lead screw actuator of claim 1, further comprising:
an accumulator communicates with said hydraulic tube.

9. An electro-hydraulic linear lead screw actuator, comprising:
an electric motor;
a hydraulic tube;
an actuator lead screw is rotatably retained in said hydraulic tube, said actuator lead screw is rotated by said electric motor;
an actuator screw nut includes a piston portion formed on an outside perimeter thereof, a lead screw thread is formed through said actuator screw nut to threadably receive the actuator lead screw, a screw relief cavity is formed in said actuator screw nut, said screw relief cavity includes a perimeter that is greater than an outer perimeter of said actuator lead screw, a first hydraulic chamber is formed in said hydraulic tube between said electric motor and a first end one end of said piston portion, a second hydraulic chamber is formed beyond a second end of said piston portion, at least one oil passage extends from a second end of said piston portion to said screw relief cavity, wherein hydraulic oil is pumped from said second hydraulic chamber through said actuator screw nut to said first hydraulic chamber by rotation of said actuator lead screw; and
an actuator rod extends from an end of said actuator screw nut, wherein rotation of said actuator ball screw causes said actuator rod to extend or retract, hydraulic fluid in said hydraulic tube supports said actuator screw nut and said actuator rod.

10. The electro-hydraulic linear lead screw actuator of claim 9, further comprising:
a first screw nut portion extends from a first end of said actuator screw nut, a second screw nut portion extends from a second end of said actuator screw nut, said lead screw thread is formed in said first and second screw nut portions.

11. The electro-hydraulic linear lead screw actuator of claim 9 wherein:
said actuator rod includes an inner rod perimeter and a threaded entrance, said inner rod perimeter is sized to receive said actuator lead screw.

12. The electro-hydraulic linear lead screw actuator of claim 11, further comprising:
a rod bearing is retained on an end of said actuator rod, said rod bearing is sized to be received by said inner rod perimeter.

13. The electro-hydraulic linear lead screw actuator of claim 11 wherein:
a rod thread is formed on said second actuator screw nut, said threaded entrance is sized threadably receive said rod thread.

14. The electro-hydraulic linear lead screw actuator of claim 9 wherein:
an outer perimeter of said piston portion is sized to be received by an inner perimeter of said hydraulic tube.

15. The electro-hydraulic linear lead screw actuator of claim 9 wherein:
a rod flat is formed on said actuator rod, a D-shaped opening is formed on one end of said hydraulic tube, said D-shaped opening is sized to receive an outer perimeter of said actuator rod, said actuator rod does not rotate relative to said hydraulic tube.

16. An electro-hydraulic linear lead screw actuator, comprising:
an electric motor;
a hydraulic tube;
an actuator lead screw is rotatably retained in said hydraulic tube, said actuator lead screw is rotated by said electric motor;
an actuator screw nut includes a piston portion formed on an outside perimeter thereof, a lead screw thread is formed through said actuator screw nut to threadably receive the actuator lead screw, a first hydraulic chamber is formed behind a first end of said piston portion, a second hydraulic chamber is formed in front of a second end of said piston portion, a screw relief cavity is formed in said actuator screw nut, said screw relief cavity includes a perimeter that is greater than an outer perimeter of said actuator lead screw, at least one oil passage extends from said second end of said piston portion to said screw relief cavity, wherein hydraulic oil is pumped from said second hydraulic chamber through said actuator screw nut to said first hydraulic chamber by rotation of said actuator lead screw; and
an actuator rod extends from an end of said actuator screw nut, wherein rotation of said actuator ball screw causes said actuator rod to extend or retract, hydraulic fluid in said first hydraulic chamber supports said actuator screw nut and said actuator rod.

17. The electro-hydraulic linear lead screw actuator of claim 16, further comprising:
a first screw nut portion extends from a first end of said actuator screw nut, a second screw nut portion extends from a second end of said actuator screw nut, said lead screw thread is formed in said first and second screw nut portions.

18. The electro-hydraulic linear lead screw actuator of claim 16 wherein:
said actuator rod includes an inner rod perimeter and a threaded entrance, said inner rod perimeter is sized to receive said actuator lead screw.

19. The electro-hydraulic linear lead screw actuator of claim 18, further comprising:
a rod bearing is retained on an end of said actuator rod, said rod bearing is sized to be received by said inner rod perimeter.

20. The electro-hydraulic linear lead screw actuator of claim 18 wherein:
a rod thread is formed on said second actuator screw nut, said threaded entrance is sized threadably receive said rod thread.

* * * * *